United States Patent [19]

Marschke

[11] Patent Number: 5,632,830
[45] Date of Patent: *May 27, 1997

[54] ADJUSTABLE BALLAST SYSTEM FOR A DOUBLE FACER

[75] Inventor: Carl R. Marschke, Phillips, Wis.

[73] Assignee: Marquip, Inc., Phillips, Wis.

[*] Notice: The term of this patent shall not extend beyond the expiration date of Pat. No. 5,466,329.

[21] Appl. No.: 515,109

[22] Filed: Aug. 14, 1995

Related U.S. Application Data

[63] Continuation-in-part of Ser. No. 292,740, Aug. 18, 1994, abandoned, which is a continuation-in-part of Ser. No. 253,647, Jun. 3, 1994, Pat. No. 5,466,329.

[51] Int. Cl.⁶ .................................. B31F 1/20; B31F 1/24
[52] U.S. Cl. .................. 156/64; 156/210; 156/359; 156/470; 156/497; 156/543; 156/555; 156/583.3; 156/583.4; 156/583.5; 156/583.91; 100/211
[58] Field of Search .................. 156/470, 459, 156/583.3, 583.5, 583.91, 205, 210, 471, 472, 473, 64, 580, 443, 543, 555, 583.4, 359, 497; 100/211

[56] References Cited

U.S. PATENT DOCUMENTS

| | | |
|---|---|---|
| 3,319,353 | 5/1967 | Matsunami et al. |
| 3,580,795 | 5/1971 | Eichenlaub ............... 156/285 |
| 3,607,523 | 9/1971 | McGirr . |
| 3,676,268 | 7/1972 | Brandenburg et al. . |
| 3,753,838 | 8/1973 | Brandenburg et al. . |
| 3,829,338 | 8/1974 | Hayasi et al. ............... 156/470 |
| 3,981,758 | 9/1976 | Thayer et al. . |
| 4,049,485 | 9/1977 | Iversen . |
| 4,311,550 | 1/1982 | Kerttula ............... 156/583.5 |
| 4,889,580 | 12/1989 | Seki et al. ............... 156/470 |
| 5,005,473 | 4/1991 | Ishibashi ............... 156/583.5 |
| 5,183,525 | 2/1993 | Thomas ............... 156/470 |
| 5,256,240 | 10/1993 | Shortt ............... 156/470 |
| 5,360,506 | 11/1994 | Thomas ............... 156/470 |
| 5,466,329 | 11/1995 | Marschke ............... 156/470 |

*Primary Examiner*—Michele K. Yoder
*Attorney, Agent, or Firm*—Andrus, Sceales, Starke & Sawall

[57] ABSTRACT

A variable load ballast system for the double facer of a corrugator includes a number of rows of holddown belt engaging ballast members positioned in side-by-side relation transversely across the belt, with the rows extending over the full heating section of the double facer. Each of the rows is divided into a number of longitudinal segments, each of which segments is controlled by a vertical actuator to move the segment between a lower full load ballast position on the belt and an upper no load position off the belt. The rows may comprise a series of ballast rollers or a continuous flexible membrane and either embodiment provides the ability to vary the ballast load on the holddown belt longitudinally, laterally and in any pattern of symmetry or asymmetry to accommodate a wide range of operating conditions and problems typically arising in the operation of a double facer. Ballast system control based on monitored web moisture content and web temperature is disclosed. An embodiment is also disclosed in which the holddown belt is eliminated.

10 Claims, 7 Drawing Sheets

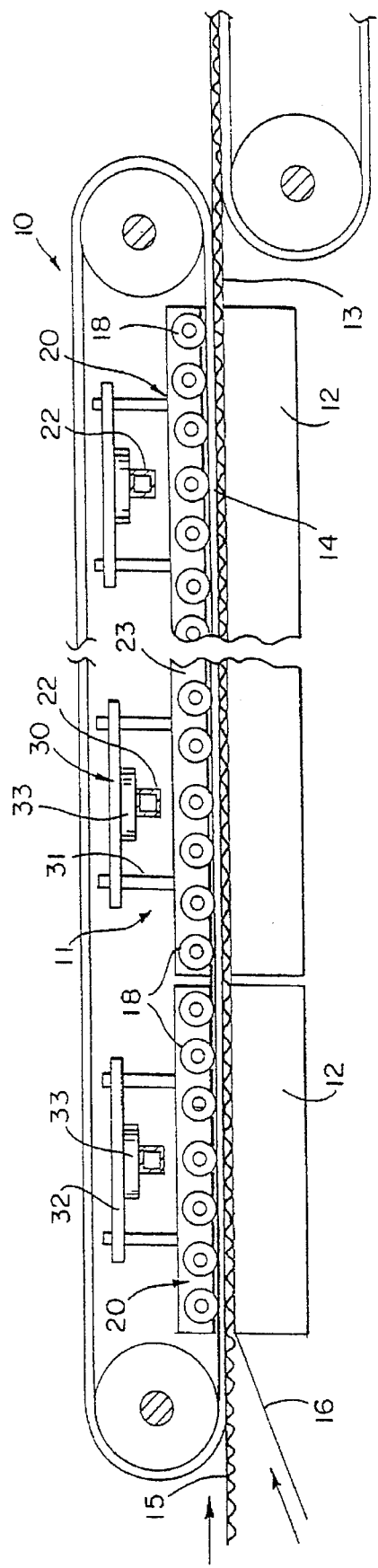
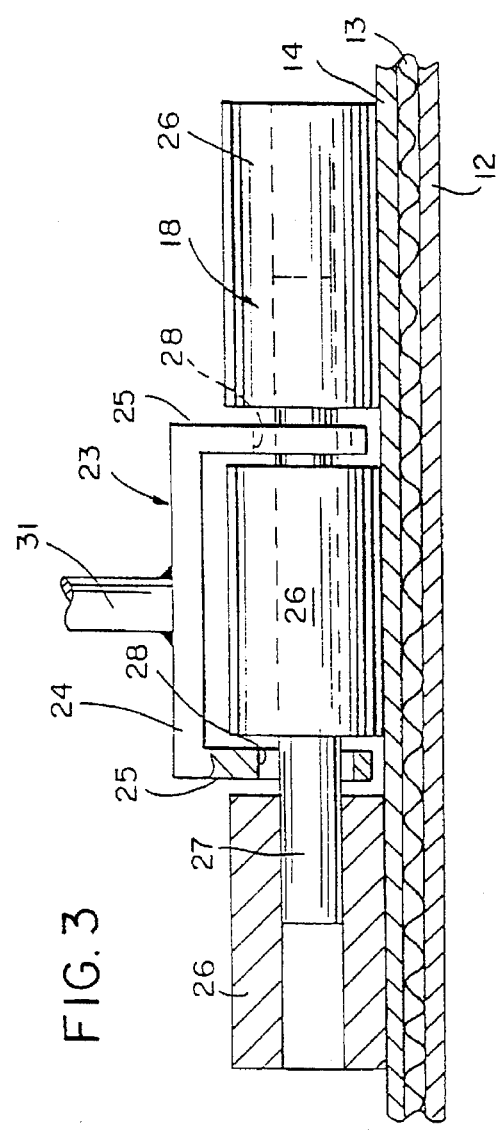

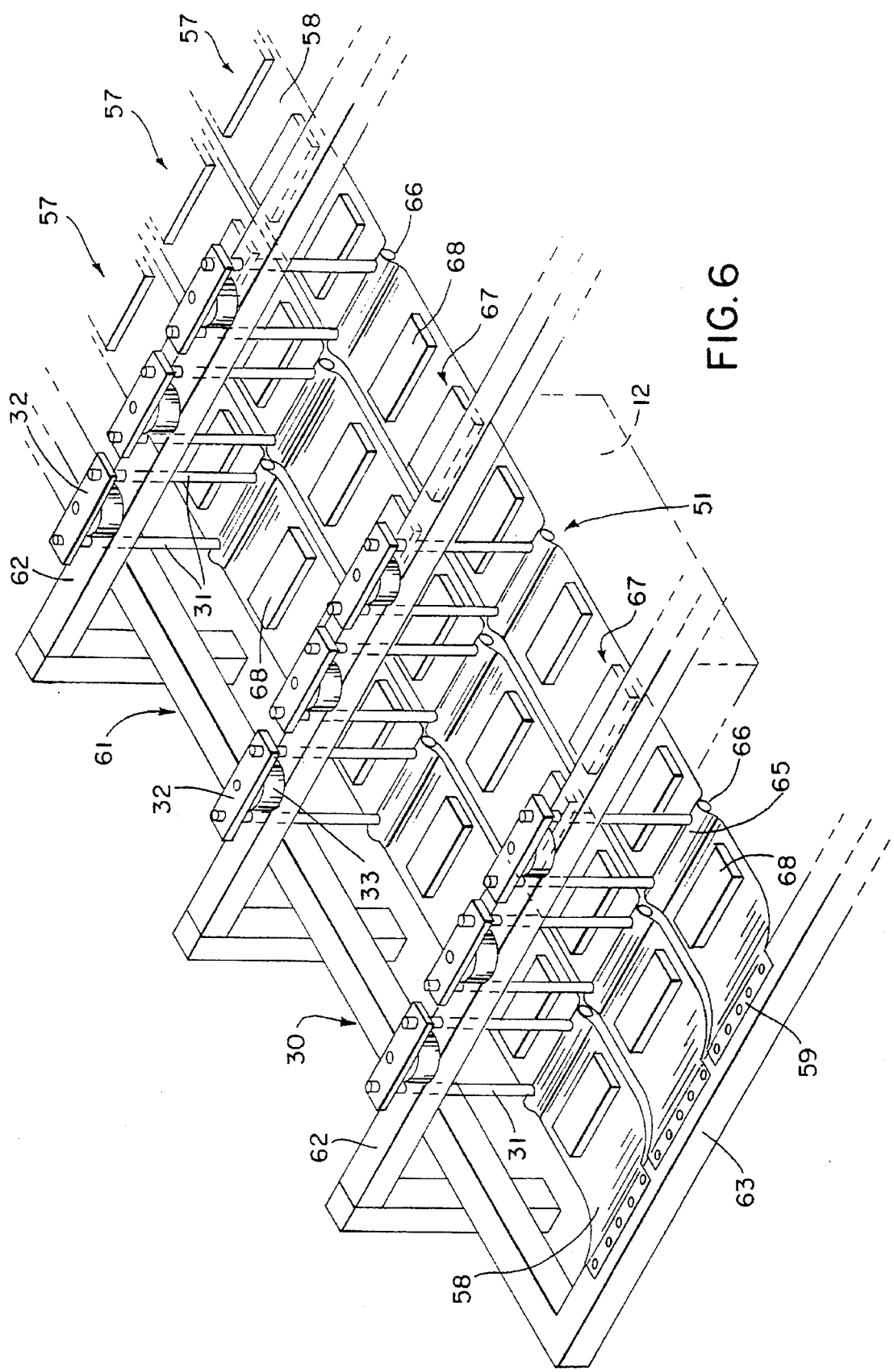

ADJUSTABLE BALLAST SYSTEM FOR A DOUBLE FACER

This is a continuation-in-part of application Ser. No. 08/292,740, abandoned, filed Aug. 18, 1994, which is a continuation-in-part of application Ser. No. 08/253,647, filed Jun. 3, 1994 now U.S. Pat. No. 5,466,329.

BACKGROUND OF THE INVENTION

The present invention relates to an apparatus for the manufacture of corrugated paperboard and, more particularly, to an adjustable ballast system for a double facer apparatus.

In a typical prior art double racer, a single web is brought into contact with the glued flute tips of a single face corrugated web and the freshly glued double face web is passed over the surfaces of a number of serially arranged hot plates to cause the starch-based glue to set. Double face web travel over the hot plates is provided by a wide driven holddown belt in direct contact with the upper face of the corrugated web, and the outer face of the belt is held in contact with the web by a series of ballast rollers or the like, all in a well known manner.

For a number of reasons, it is desirable to provide some means for varying the vertical ballast load imposed on the holddown belt, both longitudinally in the direction of belt and web movement through the double facer and laterally across the width of the belt and web. As the three paper web components comprising a double face corrugated web vary in quality and/or web thickness from one run of corrugated board to another or as double or triple wall board consisting of 2 or 3 single face webs and a bottom liner, more or less heat may be required to be applied in the double facer and, as a result, more or less ballast weight applied to the holddown belt. Variations in the speed at which the web is run may also require variations in ballast in the longitudinal direction of the web. Lateral variations in the holddown ballast across the width of the web may be desirable to compensate for the actual web width being run or because of variations in the moisture content of web components across the width of the web. Furthermore, combinations of the foregoing factors may make it desirable to simultaneously vary the holddown ballast loading both longitudinally and laterally in the double facer.

U.S. Pat. Nos. 3,676,268 and 3,753,838 both disclose systems for controlling the weight of ballast rollers positioned over the holddown belt in a double facer. The earlier patent provides rows of individual rollers extending laterally of the web (or in the cross machine direction) with several rows of rollers commonly mounted over an individual heating plate for movement together into and out of contact with the holddown belt. In addition, each roller in the group is mounted on its own vertical fluid actuator for individual positioning to vary the load imposed by the roller on the belt. The later patent utilizes parallel beams which are spaced across the width of the belt, with each beam carrying a row of rollers spaced in the direction of web movement and extending over the surfaces of a number of adjacent heating plates. Each roller is individually mounted and spring biased against the belt and each beam is independently adjustable to vary the vertical position of each row of rollers.

Other arrangements for applying variable ballast pressure to the holddown belt in a double facer are shown, for example, in U.S. Pat. No. 3,319,353 in which air pressure from overhead plenums holds the belt against the face of the corrugated web; in U.S. Pat. No. 3,607,523 in which full web width ballast rolls are lifted off the holddown belt automatically as the hot plates or steam chests pivot down and out of contact with the underside of the corrugated web; in U.S. Pat. No. 5,256,240 which utilizes pressurized air bladders to compensate for surface distortion in the supporting hot plates; and, in U.S. Pat. No. 4,049,485 where ballast roll pressure is controlled and uniformly varied along the whole heating section by a common linear actuator operating against the force of adjustable bias springs.

Although driven holddown belts are conventional and have long been used in double backers, the holddown belt and the system required to mount and drive it add considerably to the cost of the system, as well as to the complexity of operation. The typical holddown belt, which is driven to circulate around upstream and downstream pulleys, absorbs large amounts of heat transmitted through the corrugated paperboard web from the underlying hot plate system. The pulleys are typically large diameter so that the ballast load system can be positioned between the operating and return runs of the holddown belt. As a result, the holddown belt system also takes up significant additional space and dissipates large amounts of heat into the plant environment on the return run of the belt traveling in the open air above the ballast load system. The presence of a holddown belt atop the web also inhibits substantially the ability to dissipate heat rapidly, such as for emergency shutdown or web production changes.

It would be most desirable, therefore, if the holddown belt system in a double backer could be eliminated and yet retain the capability of providing a controlled web holddown force to assure proper curing of the adhesive and uniform drying of the web.

SUMMARY OF THE INVENTION

In accordance with the present invention, a system for selectively varying the vertical ballast load applied to the upper surface of the moving holddown belt and the underlying corrugated paperboard web traveling therewith over a plurality of heating units in a double facer includes a plurality of rows of belt engaging ballast members, each of which rows extends over the heating units with the plurality of rows positioned in parallel side-by-side relation transversely across the belt and the underlying corrugated web, and further includes a vertical actuator for each segment of a row which segment overlies a heating unit, the actuator being operable to move each segment between a lower full load ballast position and an upper no load position.

In a preferred embodiment of the invention, the system includes a support structure which overlies the belt and the heating units and each row of belt engaging ballast members comprises a continuous flexible membrane, a series of membrane support members which are spaced along the membrane and define the segments of the row, the upstream end of the membrane being attached to the support structure, and each of the actuators being mounted on the support structure and including a vertically positionable link which is operatively connected to a membrane support member. Each membrane support member comprises a horizontal rod section which is positioned below the membrane and within an upwardly extending corrugation formed transversely across the membrane. Ballast load elements are placed atop each of the membrane segments.

A second embodiment of the system of the present invention also includes a support structure which overlies the belt and the heating units and, in this embodiment, each row comprises a series of rollers each of which is fixed to a horizontal transversely extending roller shaft, an intermediate horizontal support arm extends over each heating unit and supports a set of the series of rollers, with each roller set comprising a segment of the row. The support arm includes pairs of oversize laterally spaced openings within each of which are received portions of a roller shaft. Each of the actuators is mounted on the support structure and includes a vertically positionable link operatively connected to a support arm such that, in the lower full load position, the shafts of the roller set comprising the segment are vertically unsupported in the support arm openings and the rollers rest on the belt and, in the upper no load position, the shafts of the roller set are supported in said openings and the rollers are spaced above the belt. Preferably, the support arms each comprise a downwardly opening channel section which includes a horizontal central web interconnecting a pair of downwardly depending legs. The pairs of oversized openings are formed in the legs of the channel section and preferably comprise vertically elongated slots. In the preferred construction of this embodiment, each roller comprises three roller units, including a center unit positioned within the channel section between the legs thereof and a pair of outboard roller units positioned outside the channel section adjacent the channel legs.

The system of the present invention also contemplates a method for controlling the heat applied to the moist web of corrugated paperboard traveling through the double facer by: forming a grid-like pattern of ballast load member segments which define parallel rows extending over the length of the heating plates and parallel tiers extending transversely of the direction of web movement across the width of the web; mounting the load member segments on vertical actuators which are operative to independently move each segment between the upper no load position and the lower full ballast load position; monitoring the moisture content of the corrugated web to detect variations in moisture content transversely across the web; and, selectively operating the actuators to vary the ballast load applied in selected rows in response to the monitored moisture content. In addition, the method may include the step of selectively operating the heating plates to vary the heat applied in selected tiers also in response to the monitored moisture content of the web.

Another embodiment of the system of the present invention eliminates the use of a holddown belt between the ballast load system and the moving web. In this embodiment, utilizing continuous flexible membranes, the lower membrane surfaces in contact with the moving web may include a friction reducing surface. Preferably, each membrane is provided with an air bearing arrangement to help support the membrane resting on the belt in the lower full load position.

In any of the foregoing embodiments of the invention, control of the actuators to vary the ballast load on the web may be effected based on monitoring web temperature. Control based on temperature may be effected independently of or in conjunction with monitoring web moisture.

BRIEF DESCRIPTION OF THE DRAWINGS

FIG. 1 is a generally schematic side elevation of a double backer utilizing the ballast system of one embodiment of the present invention.

FIG. 3 is an enlarged partial section taken on line 3—3 of FIG. 2.

FIG. 6 is a perspective view of a portion of the system shown in FIG. 5.

DETAILED DESCRIPTION OF THE PREFERRED EMBODIMENTS

Figure 2:
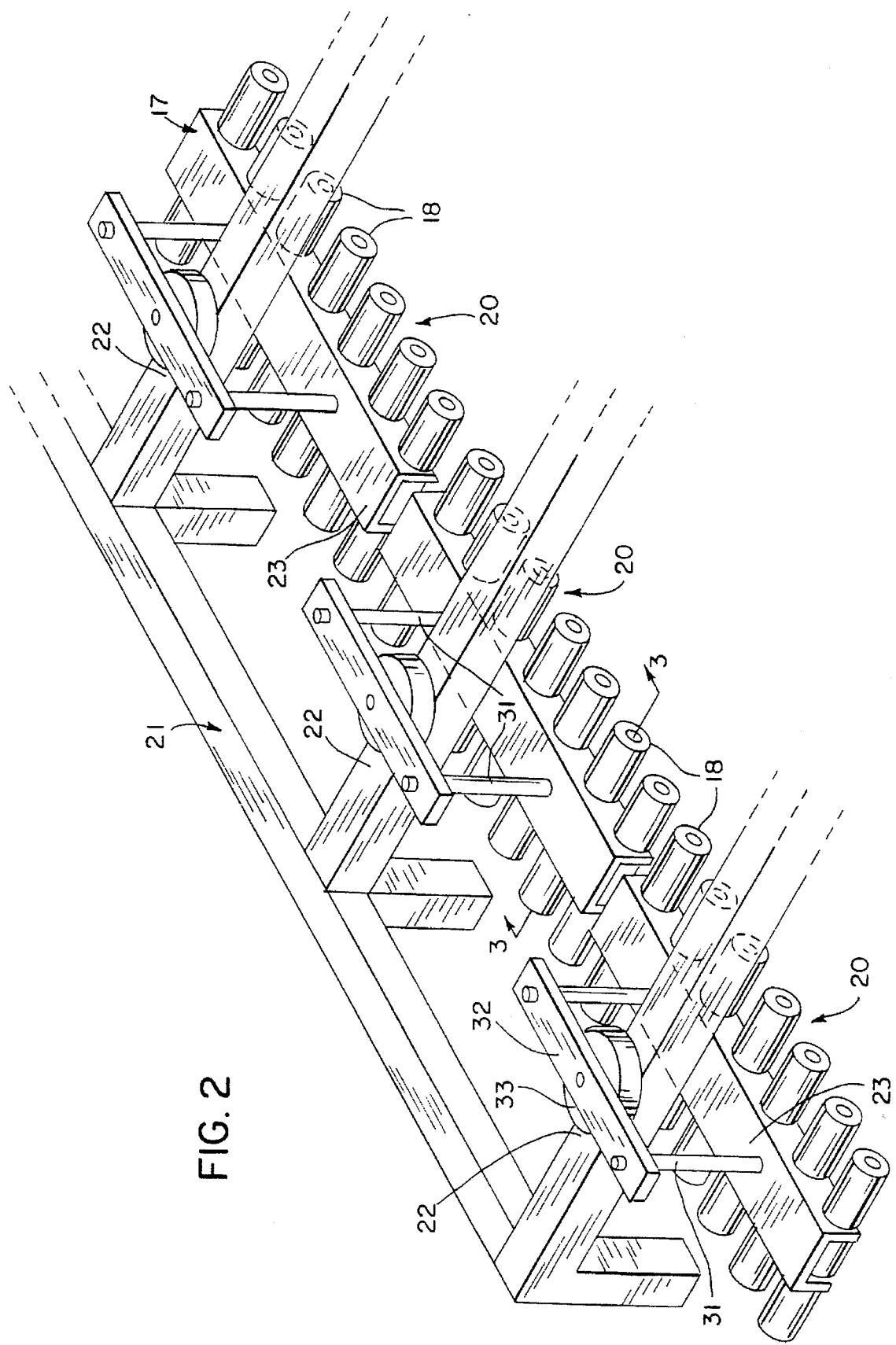
FIG. 2 is a perspective view of a portion of the system shown in FIG. 1.

Referring first to FIG. 1, a double facer 10 of generally conventional construction is shown schematically and includes a variable load ballast system 11 constructed in accordance with one embodiment of the subject invention. The double facer heating section includes a series of heating units comprising steam chests or hot plates 12 which together provide a flat, substantially continuous heated surface over which the double face corrugated web 13 is conveyed by a holddown belt 14 which is pressed against the web 13 by operation of the ballast system 11. The heat and pressure provided in the double facer cause the starch-based adhesive, by which the three component webs of the double face web 13 is formed, to gel and set. In upstream operations, not shown, a corrugated medium is glued to a facing web to form a single face corrugated web 15 and, upon entry into the double facer, another facing web 16 is brought into contact with the exposed adhesive coated flute tips of the single face web to form the double face web 13, as shown in FIG. 1.

As explained above, a number of operational problems or variations make it desirable to impose a variable force on the holddown belt 14 and thus to the double face web 13 traveling over the hot plates 12. These problems and variations include thermal expansion resulting in distortion of the horizontal supporting surface defined by the hot plates 12, variations in the quality and size of the component webs making up the double face web 13, variations in moisture content across the width of the web, and the speed at which the corrugator system is being operated.

Referring also to FIGS. 2 and 3, the ballast system 11 includes a plurality of parallel rows 17 of rollers 18, each of which rows extends over the full length of the series of hot plates 12. The rollers 18 are of small diameter, such as 1", and of an axial length of, for example, 5⅞". The rollers are closely spaced in each row with a spacing of 1" or so between the cylindrical surfaces of adjacent rollers 18. Enough rows 17 of rollers are provided to span the width of the maximum width double face web 13 capable of being processed in the double facer 10. Thus, for a 96" web, 16 rows 17 of rollers with the ends of rollers in adjacent rows spaced by about ¼" would be required.

Each row 17 of rollers is separated longitudinally into a series of segments 20. Each segment of rollers preferably extends the length in the longitudinal direction (or direction of web movement) equal to the length of one hot plate 12. Thus, with an 18" machine direction length of a hot plate, a roller segment 20 might comprise 10 rollers spaced from one another by about 1". However, variations in the size of the hot plates or steam chests, roller size and spacing, and the like may dictate many variations in the make-up of a roller segment. An overhead support structure 21 includes a series of transverse support members 22 which span the double facer unit and are spaced longitudinally in the direction of web movement approximately equal to the spacing of the steam chests or hot plates 12. Preferably, each transverse support member is centered in the longitudinal direction over a steam chest, but the longitudinal positioning and spacing of the support members 22 may be varied as desired.

Each roller segment 20 is supported by an individual support arm 23 positioned below and extending generally perpendicular to an overhead support member 22. Each support arm 23 comprises a channel section including a horizontal central web 24 interconnecting a pair of downwardly depending legs 25. Each support arm 23 is approximately as long as one roller segment or as long as a steam chest or hot plate 12.

Each of the rollers 18 preferably comprises a three unit assembly with each of the three roller units 26 fixedly attached to a common roller shaft 27. Each of the roller units is preferably made of a suitable metal, but can be made of any material having sufficient mass to provide the desired ballast load when the rollers are resting on the holddown belt 14. The roller support arm 23 includes a number of spaced pairs of vertically elongated slots 28 formed in the channel legs 25 which are adapted to receive and support the shaft 26 of each roller 18. Each of the slots 28 has a width just slightly larger than the diameter of the shaft 27 and a vertical length substantially greater so as to allow vertical sliding movement of the shaft in the slot.

Each support arm 23 is mounted for vertical movement between the belt 14 and the upper support member 22 by an actuator mechanism 30 operatively connecting the support arm to the overhead support member. Each actuator mechanism includes a pair of vertically extending tie rods 31 having their lower ends secured in the central web 24 of the support arm 23 and extending upwardly above the support member 22 with the upper ends of the tie rods secured in the ends of a horizontal bracket 32. The bracket 32 spans the support member 22 and is supported over the top of the support member by a bellows-type air bag 33. The air bag 33 has a relatively short stroke such that, when inflated, vertical upward movement of the bracket 32 and tie rods 31 initially lifts the support arm 23 and, when the roller shafts 27 bottom in the slots 28, all of the rollers in the segment 20 carried by the support arm are also lifted off the holddown belt 14. When the air bag 33 is deflated by release of the air pressure, the components of the actuator mechanism 30 are dimensioned to lower the support arm 23 to a position in which the rollers 18 are resting with their full dead weights on the belt and the roller shafts 27 are floating in the slots 28 between the upper and lower ends thereof. In this manner, there is no vertical bearing load on the roller shafts 27 as the rollers rotate from belt movement. The horizontal bearing loads imposed by the shafts bearing against the vertical downstream sides of the slots is minimal since the slots need only act as retainers to prevent downstream movement of the roller assemblies. In addition, the support arm channels 23 may be constructed of a tough plastic material such as ultra high molecular weight polyethylene extrusions, lessening the weight imposed on the actuator mechanism 30.

Figure 4:
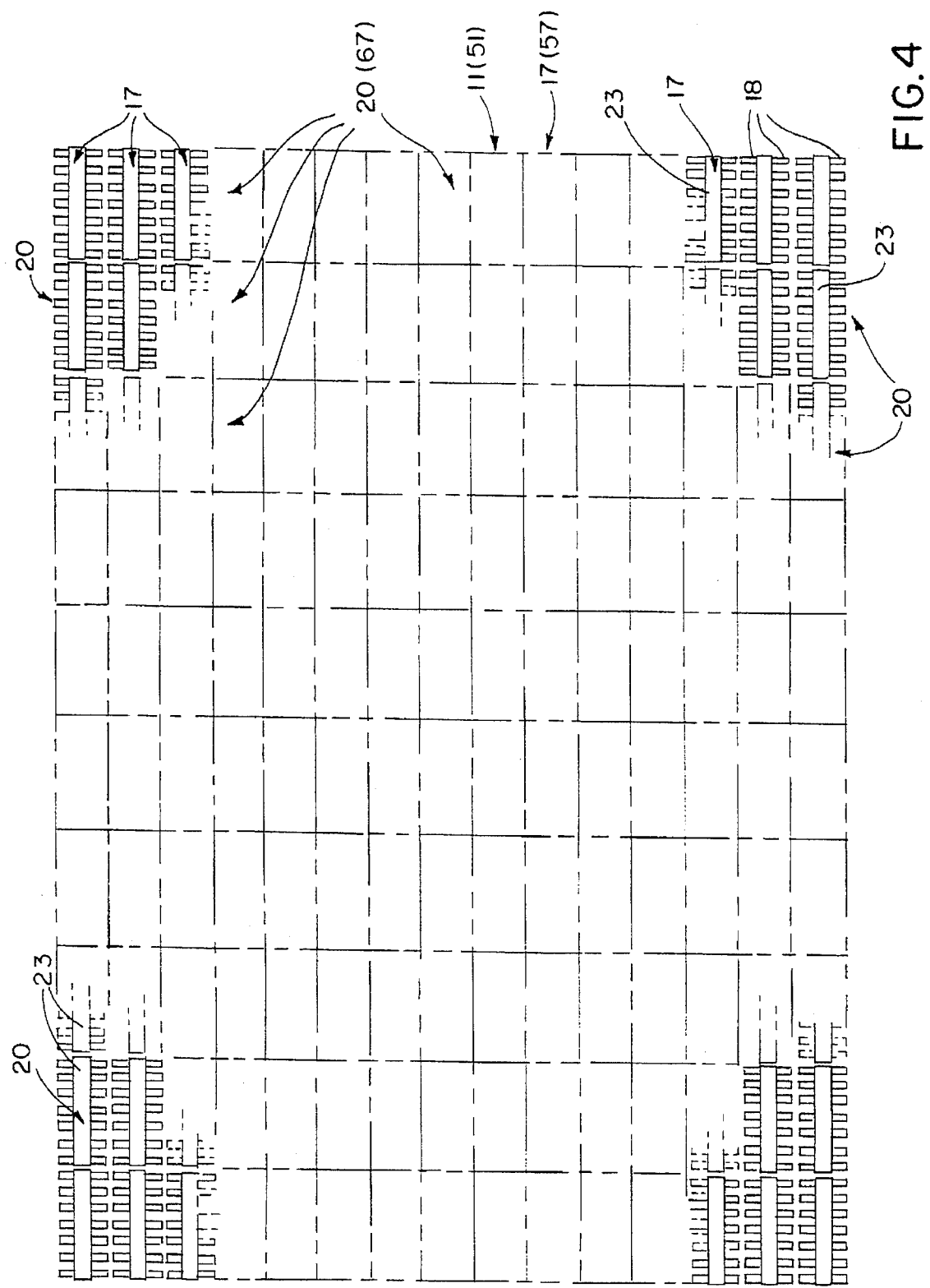
FIG. 4 is a top plan schematic view of the ballast system of the present invention.

Referring briefly to FIG. 4, showing a schematic top plan view of the ballast system 11 of the preceding embodiment as well as the ballast system 51 of the embodiment to be described, the gridwork of segments 20 or 67 each of which can be positioned vertically between a full ballast load and a no load position, provides a virtually limitless ballast load and heating profile to be attained through the double facer 10. The load and heating profiles may be varied longitudinally in the direction of web movement, laterally across the width of the web, and in either a symmetric or asymmetric pattern.

Figure 5:
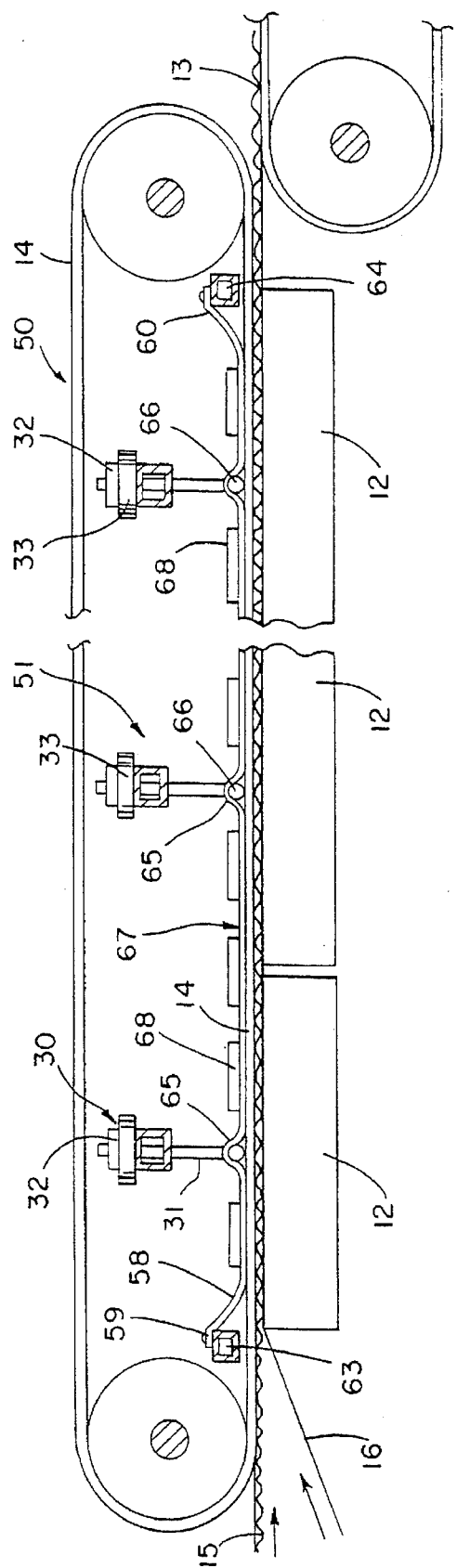
FIG. 5 is a schematic side elevation of the presently preferred embodiment of the ballast load control system of the present invention.

Referring now to the embodiment shown in FIGS. 5 and 6 which constitutes the presently preferred embodiment of the invention, the ballast system 51 functions nearly identically to the ballast system 11 of the previously described embodiment from the standpoint of providing the ability to widely vary the holddown pattern and thus the pattern of heating supplied to the web 13 from the underlying hot plates or steam chests. In this embodiment, the belt engaging ballast members comprise parallel rows 57 of continuous narrow membranes 58. Each of the membranes 58 is constructed of a flexible stainless steel sheet having a thickness of, for example, 0.008 inch. The membrane 58 may have a width of about 5⅞" (corresponding to the width of a row of rollers in the previous embodiment) and a length running the full length of the heating section of the double facer 50. An overhead support structure 61 includes an upstream cross member 63 to which the upstream end 59 of the membrane is attached, and a downstream cross member 64 to which the downstream end 60 of the membrane is attached. The catenary in the flexible membrane 58 permits most of the length thereof to sag into contact with the holddown belt 14 over the full length of the heating section. The membrane 58 is formed with a series of equally spaced corrugations 65 extending transversely across the membrane and spaced longitudinally to correspond to the length in the machine direction of a heating unit or steam chest. A horizontal rod section 66 is positioned within each corrugation 65 on the underside of the membrane and includes a pair of spaced suitably tapped connections (not shown) into which the lower ends of a pair of vertical tie rods 31 are fastened. The tie rods 31 form part of an actuator mechanism 30 which may be identical to that of the previously described embodiment, except for a slight variation in the positioning of the tie rods. Specifically, the rod sections 66 and corresponding corrugations 65 divide the membrane into a series of longitudinal membrane segments 67, each of which segments corresponds functionally to a roller segment 20 of the previously described embodiment. An actuator mechanism 30 is provided for each membrane segment 67 and includes an air bag 33 mounted to the upper side of a lateral support member 62 and operatively attached to a horizontal bracket 32 to which the upper ends of the tie rods 31 are attached. The bracket 32 extends parallel to the support member 62 which is provided with a pair of vertical clearance holes for movement of the tie rods therein.

A number of ballast load elements in the form of discrete rectangular blocks 68 are placed on the upper surface of each membrane segment 67. The ballast blocks may be made of any suitable material which provides a confined mass of suitable weight to provide a desired ballast load. When the air bag 33 is depressurized, the full weight of the membrane segment 67 and ballast blocks 68 bears on the upper surface of the holddown belt 14. When the air bag is pressurized, vertical movement of the tie rods 31 will raise the rod section 66 within the corrugation 65, causing all or a portion of the adjoining membrane segments 67 in both longitudinal directions to lift partially or completely off the belt, depending upon the length of the air bag stroke. Correspondingly, with a steam chest or hot plate 12 centered longitudinally under a support member 62 (as shown in FIG. 6), inflation of the air bag 33 will result in portions of two adjoining membrane segments 67 being lifted from the part of the belt surface in direct operative contact with the surface of the underlying hot plate. However, the positions of the hot plates longitudinally with respect to the support members 62 and actuator mechanisms 30 attached thereto may be varied as desired.

With the ballast system 51 utilizing rows of flexible membranes 58, it would also be possible to utilize air bags 33 controlled with a two level pressure system. At zero pressure, with the air bag deflated, the full weight of the membrane segment or segments is imposed on the holddown belt as previously described. At the maximum pressure setting, the air bag would be fully inflated and lift the membrane segment or adjoining segments, also as indicated. However, with a second level intermediate pressure setting, the air bag could be partially inflated to counter, for example, half of the weight of the membrane and ballast blocks controlled thereby, resulting in an intermediate ballast loading on the belt.

Referring once again to FIG. 4, the membrane segments 67 of this embodiment function essentially the same as the segments 20 of the ballast system 11 previously described. Thus, a longitudinally or laterally varying load and heating pattern may be provided and the pattern may be made symmetric or asymmetric with respect to the longitudinal centerline of the double facer. It is envisioned that the control for either ballast system 11 or 51 could include a monitoring panel patterned after the FIG. 4 schematic with each of the segments 20 or 67 represented by an LED or similar light source controlled by operation of the respective actuator mechanism 30, thereby providing an immediate visual indication of the ballast load and heating pattern applied to the holddown belt and underlying corrugated web.

The entire assembly may be raised as a unit to facilitate belt or hot plate maintenance.

It is also envisions that tie rods 31 may be guided by structure (not shown), such as through a member interconnected to supports 22.

Figures 7, 8:
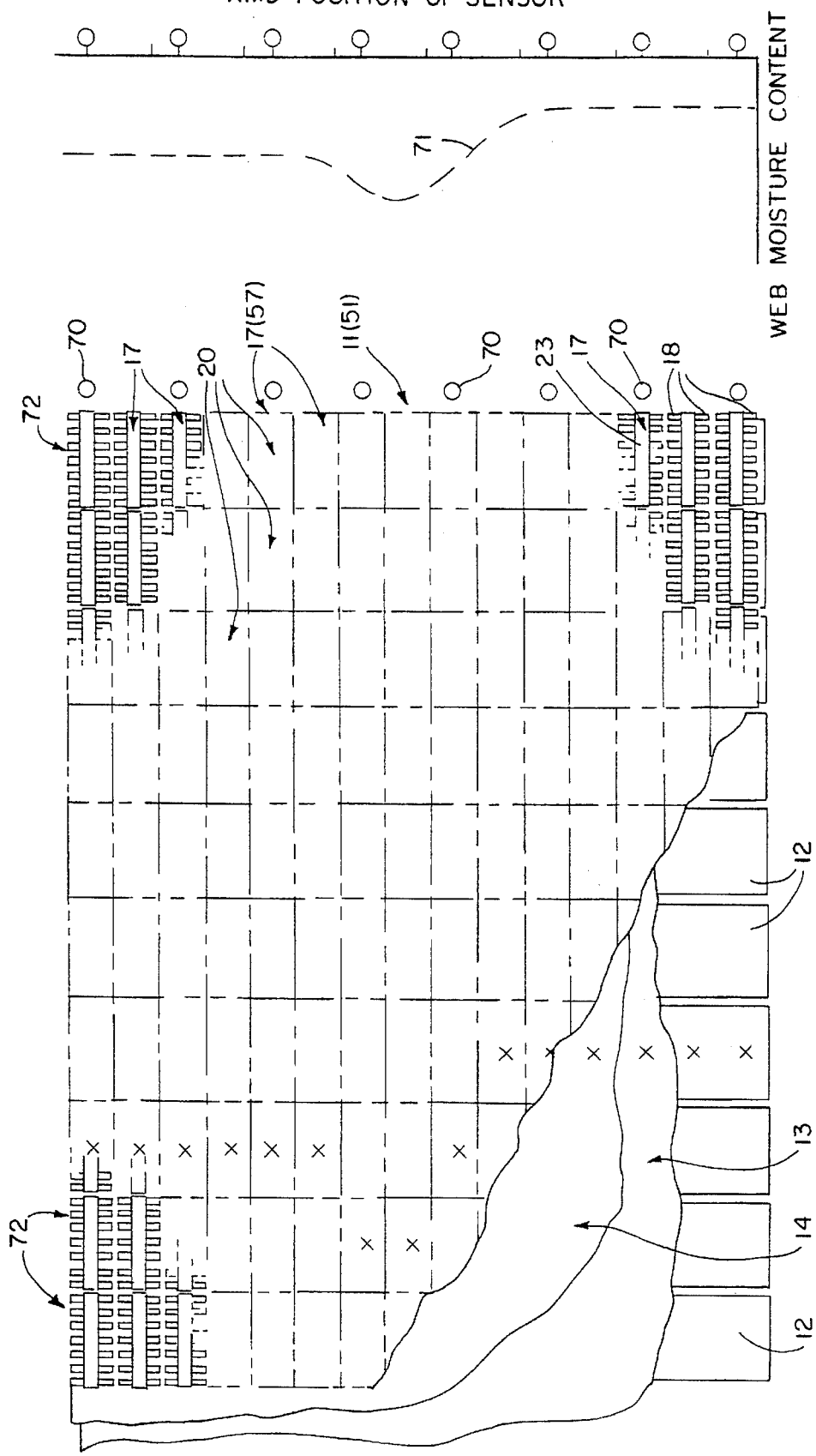
FIG. 7 is a top plan schematic view, similar to FIG. 4, showing features of the ballast load and heating control system in accordance with one aspect of the invention.
FIG. 8 is a graph showing a typical profile of moisture content variations across the width of a corrugated web processed in accordance with the subject invention.

FIG. 7 is a top plan schematic, similar to FIG. 4, showing how the subject invention can be applied to a system for controlling the heat applied to the moist double face web 13 as it travels through the double facer. In particular, the system in FIG. 7 provides control based on monitored moisture content in the web 13 which may vary significantly transversely across the web and the variations may not be longitudinally symmetrical. In other words, the moisture content of the paper webs of which the double face corrugated web is made may vary in the cross machine direction (transversely across the web). In addition, the glue applied to the component webs, either in the upstream single facet or just prior to entry into the double facer 10, may also vary in moisture content because of variations in uniformity of the glue layers applied by the two applicators (not shown).

The system also includes a series of sensors 70 aligned across the web 13 just prior to entry into the double facer for measuring the moisture content of the web. Although as shown in FIG. 7, a moisture sensor 70 is shown for every other row 17 or 57, any convenient number of sensors may be used to determine the overall variation in moisture content across the web, from which a moisture profile 71 (FIG. 8) may be constructed. In the FIG. 8 example, moisture content increases inwardly from the lateral edges toward the center of the web and the variation in moisture content across the web is asymmetric. The output of the moisture sensors 70 may be used to provide direct control of the actuator mechanisms 30 used to raise or lower the segments 20 or 67 of either of the previously described embodiments.

Referring again to FIG. 7, moisture content data from the sensors 70 is used to operate the actuators 30 in the following manner. Preferably, a reduction in heat applied to the web is accomplished in an upstream manner beginning with selected segments 20 or 67 in the downstream-most tier 72, progressing to the next upstream tier, and so forth. The air bags 33 in the actuator mechanisms for those segments overlying portions of the web where heat reduction is desired are inflated, thereby raising the segments off the belt 14 and underlying web 13. This results in a direct reduction of heat transmitted to the web by the underlying hot plate or hot plates 12. In the FIG. 7 example, the segments marked with an X indicate the downstream-most segments of each of the rows 17 or 57 which are in their lower full ballast load positions (it being understood that all segments in each of those rows upstream thereof are also in the lower full load positions). The profile defined by the downstream ends of the load bearing rows, as indicated by the dashed contour line following the pattern of Xs, is generally the same as the moisture profile 71 generated from the output of the moisture sensors 70.

Supplemental direct control of web heating can be attained by controlling the number of hot plates 12 being used, i.e. being heated or supplied with a heated fluid medium. Prior art steam chests, typically made of heavy cast iron or steel construction, require too much time to heat up or cool down to be responsive to this type of control strategy. However, the hot plate disclosed in my co-pending application Ser. No. 08/253,647, U.S. Pat. No. 5,466,329 filed on Jun. 3, 1994, provides a hot plate with a rapid temperature response which could readily be adapted to a supplemental control strategy wherein individual hot plates 12 could be turned on and shutoff with a relatively rapid heating and cooling response. Thus, in the FIG. 7 example, the heat supplied to the hot plate 12 under the downstream-most tier 72 of ballast segments would typically be shutoff. In addition, the immediately adjacent hot plate 12, over which only two ballast segments are in their lower full load positions, might be shutoff as well with relatively little loss in heating and little change in the heating profile.

It is contemplated that the control system would include an operator's monitor in which a board having the same grid-like pattern of FIG. 7 would include an array of LEDs or other light signaling devices activated by the heating control system and presenting a lighted pattern conforming to the portion of the grid activated for ballast loading.

Figure 9:
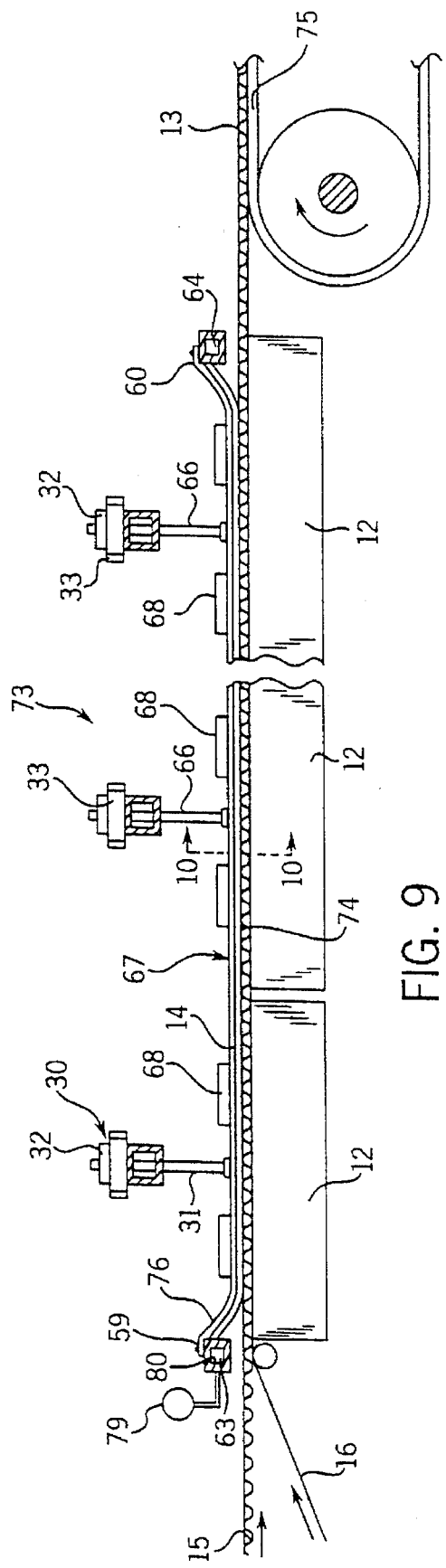
FIG. 9 is a schematic side elevation of the embodiment of the present invention in which the holddown belt has been eliminated.
Figure 10:
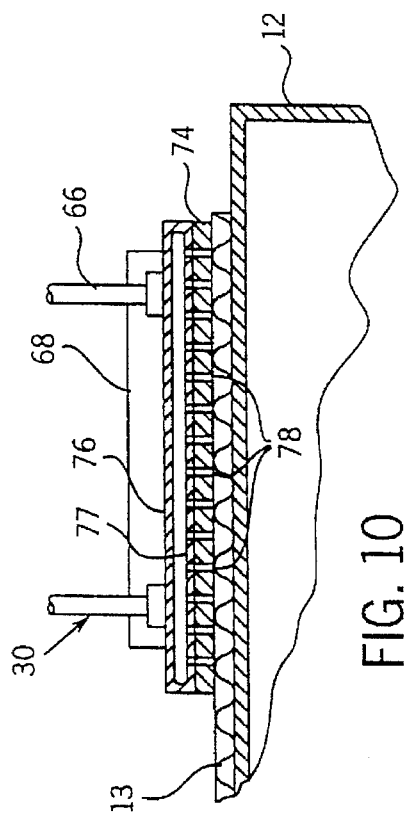
FIG. 10 is an enlarged partial sectional view taken on line 10—10 of FIG. 9.

Referring to FIGS. 9 and 10, a modified double facer 73 is shown in which the holddown belt 14 of the previously described embodiments has been completely eliminated. In this embodiment, the membranes 74 which provide the ballast load lie directly atop the moving corrugated paperboard web 13 traveling over the hot plates 12. A downstream web-pulling conveyor 75, which may include a vacuum assist, is utilized to pull the web through the double facer.

Because the moving web 13 is pulled between two relatively stationary surfaces, namely, the lower hot plates 12 and the upper membranes 74, significantly more frictional drag is imposed on the web than with systems utilizing a holddown belt as previously described. This friction not only increases the drive power requirements, but may also result in undesirable marking or other damage to the paperboard web. To reduce the frictional drag, each of the membranes 74 is provided on its upper surface with a flexible tubular housing 76. The tubular housing may be secured by its lower wall 77 to the upper surface of the membrane 74, as with a suitable adhesive or other means. Alternately, the housing could be formed without a lower wall (in a shallow inverted U-shaped section) and secured to the membrane along the lower lateral edges of the U.

The upstream and downstream ends of the tubular housing 76 are sealed and are attached with the membrane itself to the upstream and downstream cross members 63 and 64, respectively. The membrane 74 and lower wall 77 of the tubular housing are provided with a series of air distribution holes 78. A source of pressurized air 79 is connected to each of the tubular housings 76, such as by utilizing the upstream cross member 63 as an air header 80. Pressurization of the tubular housings to an appropriate level forms air bearing supports between the undersides of the membranes 74 and the upper surface of the corrugated web 13. The result is a substantial reduction in sliding friction between the membranes and the moving web. In addition, the pressurized air flow over the surface of the web assists in removing steam and moisture and in drying the web.

In other respects, the embodiment of FIGS. 9 and 10 may be similar to the embodiment shown in FIGS. 5 and 6. Thus, the actuator mechanisms 30 may be essentially the same and be operated to provide ballast load control to individual membrane segments 67. Ballast weight blocks 68 may also be attached to the upper surfaces of the tubular housings 76.

Each of the membranes 74 may be provided with a low friction or friction reducing surface, such as a Teflon coating, on its lower face. The friction reducing surface coating may be utilized instead of the air bearing support provided by the pressurized tubular housings or in conjunction therewith.

Referring again to FIG. 7, operation of the actuators 30 may also be controlled based on monitored temperature of the web 13. For example, a series of temperature sensors 81 may be positioned adjacent the underside of the web where the web exits the double backer just downstream of the last hot plate 12. Just as with the moisture sensors 70 previously described, the output from the temperature sensors 81 may also be used to provide direct control of the actuator mechanisms 30 to raise or lower the segments 20 or 67 of any of the previously described embodiments.

I claim:

1. A method for controlling heat applied to a moist web of corrugated paperboard traveling between a series of individually operable heating plates supporting a lower web face of said corrugated paperboard and a moving holddown belt in contact with an upper web face of said paperboard, said method comprising the steps of:
   (1) forming a grid pattern of ballast load member segments defining parallel rows extending over the length of the heating plates and parallel tiers, each tier extending transversely of the direction of web movement across the width of the web and generally overlying a heating plate;
   (2) mounting said load member segments on vertical actuators operative to independently move each segment between an upper no load position and a lower full ballast load position independently of any other segment and without altering the load imposed by any other segment on the holddown belt;
   (3) monitoring the moisture content of the corrugated web to detect variations in moisture content transversely across the web; and,
   (4) selectively operating the actuators to vary the ballast load applied in selected rows in response to the monitored moisture content.

2. The method as set forth in claim 1 including the step of selectively operating the actuators to move all segments comprising a selected tier to the no load positions in response to monitored moisture content.

3. The method as set forth in claim 2 including the step of disabling a heating plate below the no load tier of segments.

4. The method as set forth in claim 1 including the step of selectively operating the heating plates to vary the heat applied in selected tiers in response to the monitored moisture content.

5. A system for selectively varying the vertical ballast load applied to an upper surface of a moving corrugated paperboard web traveling over a plurality of heating units, which units are positioned in the direction of web movement in a double facer, said system comprising:
   a plurality of rows of web engaging ballast members, each row extending over the heating units, and said plurality of rows positioned in parallel side-by-side relation transversely across the web;
   each row including a plurality of segments, each segment overlying a heating unit and having a length approximately equal to the length of a heating unit;
   a vertical actuator for each of said segments, said actuator operable to move each said segment between a lower full load ballast position and an upper no load position independently of any other segment and without altering the load imposed by any other segment on the web.

6. A system for selectively varying the vertical ballast load applied to an upper surface of a moving corrugated paperboard web traveling over a plurality of heating units positioned in the direction of web movement in a double facer, said system comprising:
   a plurality of rows of web engaging ballast members, each row extending over the heating units, and said plurality of rows positioned in parallel side-by-side relation transversely across the web;
   a vertical actuator for at least some segments of a row which segments overlie a heating unit, said actuator operable to move each said segment between a lower full load ballast position and an upper no load position;
   a support structure overlying the heating units;
   each row including a continuous flexible membrane;
   a series of membrane support members spaced along the membrane and defining the segments of the row;
   the upstream end of said membrane attached to said support structure; and,
   each of said actuators mounted on said support structure and including a vertically positionable link operatively connected to a membrane support member.

7. The system as set forth in claim 6 including:
   a flexible tubular housing sealingly attached to and providing open communication with the upper surface of each membrane, said housing defining an open interior;
   a series of air distribution holes formed through the membrane to provide open communication between the housing interior and the bottom surface of the membrane; and,
   a source of pressurized air connected to the housing interior and operative to form a supporting air bearing between the bottom surface of the membrane and the upper surface of the web.

8. The system as set forth in claim 6 including a friction reducing surface on the bottom surface of the membrane.

9. A method for controlling heat applied to a moist web of corrugated paperboard traveling over a series of individually operable heating plates supporting a lower web face of said corrugated paperboard and beneath a ballast load system in contact with an upper web face of said paperboard, said method comprising the steps of:

(1) forming a grid pattern of ballast load member segments defining parallel rows extending over the length of the heating plates and parallel tiers, each tier extending transversely of the direction of web movement across the width of the web and generally overlying a heating plate;

(2) mounting said load member segments on vertical actuators operative to independently move each segment between an upper no load position and a lower full ballast load position independently of any other segment and without altering the load imposed by any other segment on the corrugated paperboard web;

(3) monitoring the moisture content of the corrugated web to detect variations in moisture content transversely across the web; and, (4) selectively operating the actuators to vary the ballast load applied in selected rows in response to the monitored moisture content.

10. A system for selectively varying the vertical ballast load applied to an upper surface of a moving corrugated paperboard web traveling over a plurality of heating units, which units are positioned in the direction of web movement in a double facer, said system comprising:

a plurality of rows of ballast members, each row extending over the heating units and the web, said plurality of rows positioned in parallel side-by-side relation transversely across the web;

each row including a plurality of segments, each segment overlying a heating unit and having a length approximately equal to the length of a heating unit;

a vertical actuator for each of said segments, said actuator operable to move each said segment between a lower full load ballast position and an upper no load position independently of any other segment and without altering the load imposed by any other segment on the web;

means for monitoring the temperature of the web transversely across the web; and, control means for selectively operating the actuators to vary the ballast load in response to monitored temperature.

* * * * *